United States Patent [19]

Araki et al.

[11] Patent Number: 4,837,089

[45] Date of Patent: Jun. 6, 1989

[54] HIGH HARDNESS COMPOSITE SINTERED COMPACT

[75] Inventors: Masatada Araki, Handa; Yutaka Kuroyama, Chita, both of Japan

[73] Assignee: Nippon Oil and Fats Company, Limited, Japan

[21] Appl. No.: 132,263

[22] Filed: Dec. 14, 1987

[30] Foreign Application Priority Data

Dec. 19, 1986 [JP] Japan ................................ 61-301803

[51] Int. Cl.[4] ............................................... B22F 3/00
[52] U.S. Cl. ...................................... 428/552; 419/11; 419/13; 428/408; 428/621; 428/627
[58] Field of Search ............... 428/552, 408, 621, 627; 419/11, 13

[56] References Cited

U.S. PATENT DOCUMENTS

| | | | |
|---|---|---|---|
| 2,382,666 | 8/1945 | Rohrig et al. | 419/11 |
| 3,856,480 | 12/1974 | Johnson et al. | 428/552 |
| 4,353,963 | 10/1982 | Lee et al. | 419/11 |
| 4,380,471 | 4/1983 | Lee et al. | 419/11 |
| 4,621,031 | 11/1986 | Scruggs | 428/551 |
| 4,686,080 | 8/1987 | Hara et al. | 419/11 |

FOREIGN PATENT DOCUMENTS

| | | |
|---|---|---|
| 55-32734 | 3/1980 | Japan. |
| 56-54278 | 5/1981 | Japan. |
| 58-84187 | 5/1983 | Japan. |
| 60-85940 | 5/1985 | Japan. |

*Primary Examiner*—Stephen J. Lechert, Jr.
*Attorney, Agent, or Firm*—Arnold, White & Durkee

[57] ABSTRACT

A composite sintered compact consisting of a sintered body portion, which contains at least one of high density boron nitride and diamond, and a cermet or metal portion bonded to the sintered body portion through an amorphous metal interposed between the sintered body portion and the cermet or metal portion at their bonding area, has high hardness and strength, and further has excellent handleability, heat resistance and toughness during the whole processes ranging from its production to its consumption.

2 Claims, No Drawings

HIGH HARDNESS COMPOSITE SINTERED COMPACT

BACKGROUND OF THE INVENTION (1) Field of the Invention

The present invention relates to a composite sintered compact comprising a sintered body, which contains at least one of high density boron nitride and diamond, and a cermet or a metal bonded to the sintered body, which sintered compact is used as a cutting tool, draw die, wear-resistant material and the like. The compact superior to conventional composite sintered compacts in the bonding strength and is easily sintered during its production.

(2) Related Art Statement

Composite sintered compacts are produced due to the following two reasons.
(1) A sintered body portion cannot be brazed to other material, and hence a substrate is bonded to the sintered body portion, so that the resulting composite sintered compact can be brazed to other material at the substrate portion.
(2) A sintered body portion consists of a high-hardness material, and hence the sintered body portion is strong, but is brittle. Therefore, the sintered body portion is lined with a cermet or a metal, both of which have a toughness higher than the that of the sintered body portion, to produce a composite sintered compact having a high toughness as a whole.

The bonding structure of the sintered body portion with the cermet or metal portion (hereinafter, referred to as substrate) in the conventional composite sintered compact can be classified as one of the following three types.
(1) A structure obtained by a method, wherein a sintered body portion containing a metal is simply superposed on a substrate portion, and the superposed mass is sintered to dissolve mutually the metal contained in the sintered body portion and the metal contained in the cermet of the substrate portion or the metal contained in the substrate portion.
(2) A structure obtained by a method, wherein a sintered body portion is superposed on a substrate portion through a metal or cermet interposed between them, said metal or cermet being used independently of the kinds of the sintered body portion and substrate portion, and the superposed mass is sintered to bond the sintered body portion to the substrate portion through the metal or cermet.
(3) A structure obtained by a method, wherein a sintered body portion containing no metal is superposed on a cermet, and the superposed mass is sintered such that a metal contained in the cermet is diffused by the capillary action into the space between the powders of the high density boron nitride and/or diamond, whereby he fellow powders of the high density boron nitride and/or diamond are bonded to each other, and at the same time the cermet portion is bonded to the sintered body portion.

Any of composite sintered compacts produced at present have fundamentally the same structure as one of the above described three kinds of structures, a structure which is a little modified from the above described structures, or a structure of a combination thereof.

In the production of a composite sintered compact, a proper structure is selected from the above described three kinds of fundamental structures depending upon the use purpose and use condition of the resulting composite sintered compact, the manufacturing technic and manufacturing apparatus possessed by the manufacturer, and other conditions, and it can not be affirmed which of the above described structures is superior or inferior. However, there is a common trouble to all structures due to the structure formed by the bonding of different kinds of materials. That is, a composite sintered compact is exposed to a temperature ranging from room temperature to one thousand and several hundreds degree in centigrade during the processes from its production to its consumption, that is, the process of the production of the composite sintered compact through sintering, process of the working of the composite sintered compact into manufactured goods, such as cutting tool, draw die and the like, by its brazing to the based metal for cemented carbide or the like, and the process of the use of the product. In this case, the sintered body and the substrate are different in thermal expansion coefficient from each other due to the difference in the material constituting them, and hence the composite sintered compact is exposed to a stress caused by the difference in the thermal strain at every temperature between the sintered body and the substrate. When the substrate is made of cermet, it is possible to produce a substrate having a thermal expansion coefficient near that of the sintered body portion by adjusting the amount of the ceramic portion and that of the metal portion. However, such an adjustment is possible only at a specifically limited temperature, and it is impossible to carry out the adjustment over a whole temperature range, to which the composite sintered compact is exposed, due to the reason that the sintered body is different from the substrate in the change of thermal expansion coefficient due to the temperature change. When a substrate made of metal is used, the thermal expansion coefficient of the substrate can be adjusted to that of the sintered body portion only at a specifically limited temperature as well as the case of the substrate made of cermet. However, it is impossible to effect the adjustment over a whole temperature range, to which the composite sintered compact is exposed. Moreover, even when the requirements relating to the thermal expansion coefficient are attained, other requirements, such as heat resistance, strength and affinity of the substrate to the sintered body portion in the bonding, can not be substantially satisfied.

As described above, there are various problems in the conventional composite sintered compacts. First, there is always a risk of formation of cracks, according to the mechanism explained hereinafter, in all the processes from the production of the composite sintered compact to the consumption thereof due to the thermal stress caused therein by the difference in the thermal expansion coefficient between the sintered body portion and the substrate due to the bonding of different materials.

(1) A composite sintered compact is produced by a sintering under a certain constant temperature and pressure condition, and after completion of the sintering, the temperature and the pressure are reduced to room temperatures and normal pressures. In this case, the composite sintered compact, which has been sintered while maintaining the equilibrium in the shape under the certain constant temperature and pressure condition, is exposed to a severe temperature and pressure change of from one thousand and several hundreds degree in centigrade to room temperature and from several tens thousands atmospheres to normal pressures in a very short period of time of from several minutes to several tens of minutes. Therefore, the difference in the thermal expansion coefficient between the sintered body and the substrate is varied corresponding to the temperature change during the cooling, and hence the thermal stress caused in the sintered body is different from that caused in the substrate. Moreover, the sintered body is different from the substrate in modulus of elasticity, and hence the sintered body is different from the substrate in the deformed amount of shape corresponding to the change of pressure. As a result, a very complicated strain is caused in the resulting composite sintered compact. Accordingly, the prevention of the development of cracks in the composite sintered compact due to the stress caused therein has been a problem which requires a complex technique in the production of the composite sintered compact.

(2) Even when the above described problem has been solved and a good composite sintered compact free from cracks has been produced, the composite sintered compact is brazed at its substrate to other materials to obtain a manufactured good in many cases. The brazing temperature depends upon the melting temperature of the solder, and the brazing is generally carried out at a temperature of not higher than 800° C. In this case, the brazing to other material is carried out under normal pressures, and therefore although stress due to the variation of pressure is not caused, thermal stress is naturally caused, and further stress is caused in th composite sintered compact due to the difference in thermal expansion coefficient between the composite sintered compact and the material, to which the composite sintered compact is brazed. For example, when a composite sintered compact is brazed to a steel having a carbon content of 0.06%, the steel has an average linear thermal expansion coefficient of about $13 \times 10^{-6}/°$ C. within the temperature range of 0°-300° C., but a tungsten carbide-cobalt alloy, which is one of cermets to be predominantly used for substrates, has a low linear thermal expansion coefficient of $(4-7) \times 10^{-6}/°$ C. in a wide cobalt content range of 3-20% by weight. Moreover, the thermal expansion coefficient of the sintered body portion varies depending upon the kind and amount of materials to be added to the basic component of the sintered body portion at the sintering. When high density boron nitride and/or diamond are used as the basic component, the thermal expansion coefficient of high density boron nitride is a very low value of $4.8 \times 10^{-6}/°$ C. at 430° C., and those of diamond are also very low values of $1.5 \times 10^{-6}/°$ C. at 78° C. and $3.5 \times 10^{-6}/°$ C. at 400° C. Accordingly, the difference in the thermal expansion coefficient between the sintered body and the substrate are large in the whole constitution of a cutting tool using the composite sintered compact, and a complicated thermal stress is caused in the composite sintered compact. Therefore, there is a high risk of formation of cracks in the composite sintered compact.

(3) Cutting is an operation which imposes the severest condition on a composite sintered compact during its use among other operations carried out by use of the composite sintered compact. A composite sintered compact containing diamond is predominantly used in the cutting of non-ferrous metal under a low load, and is not used many times in the cutting under severe conditions. However, almost all composite sintered compacts containing high density boron nitride are used in the cutting of iron, steel or ferrous alloy and are used very often in interrupt cutting under a high load. In such a case, the cutting edge-temperature generally reaches a high temperature of about 800° C., and hence the composite sintered compact is exposed to a very severe condition caused by a synergistic effect of thermal stress due to the high temperature, impact load and vibration, and cracks often are formed.

The type of stresses caused in a composite sintered compact mainly due to heat during the above described three kinds of processes from its production to its consumption are not uniform, and it is difficult to solve by the same simple method the troubles caused in these three processes. However, a common problem caused in these three processes is a thermal stress caused by the bonding of different materials into a monolith composite sintered compact.

In order to solve this problem, it has been thought of producing a composite sintered compact consisting of a sintered body and a substrate, both having the same thermal expansion coefficient over the whole temperature range. However, it is impossible to produce such composite sintered compact as described above. Further, it has been thought that the above described problem might be solved by producing a sintered body and a substrate, both having a strength sufficiently higher than the thermal stress to be generated therein. However, although it may be possible to produce a sintered body and a substrate, both having a strength sufficiently higher than the thermal stress generated therein within a room temperature range, it is substantially impossible to produce a sintered body and a substrate, both having a strength sufficiently higher than the thermal stress generated therein within a high temperature range which lowers the strengths of the sintered body and substrate. Therefore, it is impossible to prevent the formation of cracks in a composite sintered compact within the whole processes from its production to its consumption.

As a final means, there can be thought of a method, wherein a material different from both of a sintered body and a substrate is interposed between them in order to act to bond the sintered body with the substrate and to relax thermal stress and other various stresses. This method corresponds to method (2) among the above explained three kinds of methods for bonding a sintered body with a substrate. However, whether the different material (hereinafter, referred to as an intermediate layer), which is interposed between the sintered body and the substrate, is a cermet or a metal, the following problems still remain. The intermediate layer is required to have the following properties.

(1) The intermediate layer has an affinity to both the sintered body and the substrate.
(2) The intermediate layer has a thermal expansion coefficient approximate to those of the sintered body and the substrate.
(3) The intermediate layer has a high strength over a wide temperature range.
(4) The intermediate layer has a high toughness and has high resistances against impact stress and repeating stresses.

It is very difficult to produce an intermediate layer which can satisfy all of the above described requirements. Particularly, it is very difficult to produce an intermediate layer which can satisfy the requirement (4). In the conventional composite sintered compact, the sintered body has hitherto been very often peeled off from the substrate at the intermediate layer or at the vicinity thereof under a severe cutting condition.

In order to solve the above described problems, the inventors have made various theoretical and experimental investigations for a long period of time with respect to the means and structures for bonding the sintered body to the substrate, and reached the present invention.

The theoretical ground of the present invention will be explained hereinafter.

As described above, the sintered body and the substrate are essentially different in object from each other. Therefore, it is desirable to produce a sintered body and a substrate from different materials, each having a property which satisfy the object of each of the sintered body and the substrate, respectively. Moreover, it is necessary that both the materials can be bonded with each other, and the bond between both the materials can resist the above described very severe condition. It is very difficult to bond two materials, which have different properties and objects from each other, by their own bonding ability under a very severe condition without causing stress, and hence composite sintered compacts having no drawbacks have not hitherto been obtained. When a sintered body is bonded to a substrate through an intermediate layer, which acts to bond the sintered body with the substrate, it is not necessary to use a sintered body and a substrate, both of which have mutually a bonding ability in themselves, and therefore it seems that a more excellent composite sintered compact can be obtained. However, there has not yet been obtained an excellent material, which is adapted to be used in the intermediate layer and can satisfy the above described requirements. Therefore, it has been difficult to produce a composite sintered compact having excellent properties by bonding a sintered body with a substrate through an intermediate layer interposed, therebetween. However, when an excellent material to be used as an intermediate layer can be discovered, a composite sintered compact having the most excellent bonding structure can be produced as described above by interposing an intermediate layer between the sintered body and the substrate. Therefore, in the present invention, the composite sintered compact is limited to a composite sintered compact having a structure, wherein an intermediate layer is interposed between a sintered body and a substrate, and investigations have been carried out with respect to the affinity and bonding strength of various materials which are to be used in the intermediate layer, to two materials which are to be used in the sintered body and in the substrate, and further with respect to the toughness against various stresses and the heat resistance of various materials which are to be used as the intermediate layer, during the processes ranging from the production of the composite sintered compact to the consumption thereof.

First, an explanation will be made with respect to the affinity of materials to be used as the intermediate layer. A sintered body contains high density boron nitride and/or diamond as a main component. That is, boron which is an element constituting high density boron nitride has an affinity to high density boron nitride, and hence it is easy that a material, which contains boron as one of the elements constituting the material, wets high density boron nitride, or forms a compound or a solid solution together with a high density boron nitride. As materials other than the material containing boron, there are advantageously used materials containing Ti, Zr, Hf, Al, Mg or Si, because these elements have a wettability with high density boron nitride. When a sintered body consists of diamond, materials containing Fe, Co, Ni, Cr, Mn, Mo, Ta, Nb, Cu, Au or Ag are advantageously used as the intermediate layer. Because, these elements can form a solid solution with carbon at high temperatures and pressures and have a high wettability with carbon as is understood from the phenomena that these elements are used alone or in combination with other metals as a melting solvent in the synthesis of diamond or as both of a melting solvent and a filler in the sintering of diamond.

Then, an explanation with respect to the bonding strength, toughness and heat resistance of the material to be used as the intermediate layer will be explained. These properties are automatically determined depending upon the kinds of the materials to be used as the intermediate layer, and it is not proper that these properties are separately discussed. Generally speaking, there have hitherto been used metals, such as Ti, Zr, Cu, Mo, W, Ni, Co and the like, and cermets containing carbide or nitride of these metals. The drawbacks of these metals and cermets will be explained, and further an explanation will be made with respect to the intermediate layer having a desired property in order to overcome the drawbacks of these metals and cermets. Ti and Zr are substantially satisfactory with respect to the bonding strength and heat resistance. However, in the production of a composite sintered compact, a sintered body and a substrate are bonded through Ti or Zr at high temperatures under high pressures, and therefore Ti or Zr is apt to react with high density boron nitride and/or diamond in the sintered body to form boride, nitride and carbide of Ti or Zr. When the amount of these metals is large, although a composite sintered compact having high strength and heat resistance is obtained, the composite sintered compact is brittle. Moreover, the amount of Ti or Zr is difficult to control, and therefore the sintered body is often peeled off from the substrate after sintering in the production of a composite sintered compact or during the use of the resulting composite sintered compact. Moreover, both Ti and Zr are high-melting point metals, and therefore the bonding of a sintered body with a substrate through Ti or Zr is difficult unless the sintering temperature is high. Cu has a low melting point, and therefore Cu has a good workability. Moreover, Cu has a high affinity to both of various kinds of sintered bodies and substrates. However, Cu has such a drawback that Cu is softened, due to its low melting temperature, by the high temperature during the use of the resulting composite sintered compact, and hence the sintered body is easily separated from the substrate. Mo and W have a very high melting point contrary to Cu, and therefore it is difficult to bond a sintered body with a substrate through the Mo or W intermediate layer, and moreover even when a sintered body is bonded with a substrate through the Mo or W intermediate layer, the Wo or W intermediate layer is poor in toughness. When cermet is used as an intermediate layer, the cermet intermediate layer is poor in toughness similarly to the case of W and Mo.

In order to solve the above described problems, the inventors have made various theoretical and experimental inventions with respect to the properties, which are demanded of the intermediate layer, and to the materials suitable to be used as the intermediate layer, and have found out the following facts. That is, when an amorphous metal is used as an intermediate layer, particularly when an amorphous metal containing at least one element selected from the group consisting of Ti, Zr, Hf, Fe, Co, Ni, Cr, Mn, Mo, Ta, Nb, Cu, Au, Ag, B, Al and Si, is used as an intermediate layer, the intermediate layer can exhibit excellent performance for all the above described various demands.

SUMMARY OF THE INVENTION

The feature of the present invention lies in a composite sintered compact consisting of a sintered body portion, which contains at least one of high density boron nitride and diamond, and a cermet or metal portion bonded to the sintered body portion through an amorphous metal interposed between the sintered body portion and the cermet or metal portion at their bonding area.

DESCRIPTION OF THE PREFERRED EMBODIMENT

The reason why a composite sintered compact which has a high strength, and has excellent handleability, heat resistance and toughness during processes ranging from its production to its consumption, can be obtained by using, as an intermediate layer, an amorphous metal, particularly an amorphous containing at least one element selected from the group consisting of Ti, Zr, Hf, Fe, Co, Ni, Cr, Mn, Mo, Ta, Nb, Cu, Au, Ag, B, Al and Si, is thought as follows.

First, the influence of amorphous metals on the bonding strength in resulting composite sintered compact will be explained. It is known that amorphous metals are higher in diffusion velocity than crystallized metal at the same temperature. Therefore, when a composite sintered compact using an amorphous intermediate layer and a composite sintered compact using a crystallized metal intermediate layer are produced under the same sintering temperature condition, the element constituting the amorphous intermediate layer is diffused into each of the sintered body and the substrate at a rate, which is higher than the diffusion rate of the element constituting the crystallized metal intermediate layer into each of the sintered body and the substrate, to bond monolithically the sintered body and the substrate through the amorphous intermediate layer, resulting in a composite sintered compact. That is, the use of the amorphous intermediate layer results in a composite sintered compact having a structure more monolithic than a structure obtained by the use of a crystallized metal intermediate layer in the same period of time. Further, Ti, Zr, Hf, B, Al and Si have a high affinity to high density boron nitride as described above, and therefore the use of an amorphous metal containing these elements can probably produce a composite sintered compact, wherein the sintered body portion and the intermediate layer is firmly bonded into a monolithic structure. Particularly, an amorphous metal containing B has a melting temperature lower than that of an amorphous metal not containing B, and therefore the amorphous metal containing B, used as an intermediate layer, begins to diffuse into a sintered body at a stage earlier than the beginning stage of the diffusion of an amorphous metal not containing B. In general, when an amorphous metal and an alloy, both consisting of the same elements, are compared with each other, the amorphous metal has often a solidification-beginning temperature lower than that of the alloy, and therefore the development of thermal stress in the resulting composite sintered compact due to the difference between the thermal expansion coefficient of the sintered body and that of the substrate is prevented by retarding the solidification of the metal portion during the cooling carried out after completion of the sintering in the production of the composite sintered compact, whereby the development of cracks in the sintered body and substrate is effectively prevented, or the peeling off of the sintered body from the substrate in the intermediate layer portion or in the vicinity thereof is effectively prevented. After completion of the sintering, the amorphous portion is present in two states. One of which the amorphous portion has been diffused into both the sintered body and the substrate to form an element or elements constituting each of the sintered body and the substrate, and in the other of which the amorphous portion has decreased in its thickness but still remains in the form of an intermediate layer. Which state is to be formed is a matter belonging to the design of composite sintered compact, and both states can attain the object of the present invention. However, amorphous metals have a melting temperature lower than that of crystallized metal, and therefore when the amorphous metal remains in the form of an intermediate layer, there might be a fear that the amorphous metal will soften more rapidly than crystallized metal at high temperatures, and thus have an adverse influence on the bonding strength. However, such a problem does not occur, because, a melt consisting mainly of metal element is not formed into an amorphous metal but is crystallized unless the melt is cooled at an extremely high cooling rate, and hence the intermediate layer remains in the form of a crystallized metal which is higher in melting point than the original amorphous. It is inevitable that a certain amount of residual stress remains in the resulting composite sintered compact independently of its structure and its production method. However, according to the present invention, the amount of residual stress in the resulting composite sintered compact can be suppressed to the minimum amount by the above described mechanism, and hence the composite sintered compact is hardly broken even when the sintered compact is subjected to an impact load during the use. Moreover, the element constituting the amorphous intermediate layer is metal or semimetal, and is higher in shock resistance, that is, in toughness than cermet.

In the production of a composite sintered compact having a sintered body portion containing diamond, an excellent composite sintered compact can be fundamentally obtained as well by using amorphous as an intermediate layer. In this case also, it is proper to use, as an intermediate layer, an amorphous metal containing an element selected from the group consisting of Fe, Co, Ni, Cr, Mn, Mo, Ta, Nb, Cu, Au and Ag due to the above described reason. The use of an amorphous containing these metals as an intermediate layer in the production of a composite sintered compact comprising a diamond is the same as the case of a composite sintered compact comprising a sintered body containing high density boron nitride with respect to the bonding strength, and the heat resistance and toughness during the processes ranging from the production to the consumption of the composite sintered compact.

As described above, any amorphouses metals can be fundamentally used as an intermediate layer. However, when it is intended to produce a composite sintered compact by using, as an intermediate layer, an amorphous metal having the above described specifically limited composition, it is more preferable to select properly different amorphous metals to be used as an intermediate layer corresponding to the case, wherein a sintered body containing high density boron nitride is used, or to the case, wherein a sintered body containing diamond is used. That is, the amorphous metal to be used in the intermediate layer should be properly selected depending upon the kinds of materials contained in the sintered body and in the substrate. It is easy for those skilled in the art to select a proper amorphous metal to be used as the intermediate layer, based on the general acknowledgment relating to the sintered body and to the substrate referring to the disclosure in this specification.

The present invention will be explained in more detail referring to the following Examples and Comparative examples.

EXAMPLE 1

A powdery mixture of 68% by volume of cubic boron nitride (hereinafter, abbreviated as CBN), 7% by volume of wurtzite-type boron nitride (hereinafter, abbreviated as WBN), 12% by volume of titanium carbide (hereinafter, abbreviated as TiC), 6% by volume of titanium nitride (hereinafter abbreviated as TiN) and 7% by volume of Al was fully mixed for 4 hours in a ball mill made of cemented carbide to produce a green powder for a sintered body. Separately, a powdery mixture of 87% by volume of tungsten carbide (hereinafter, abbreviated as WC) and 13% by volume of cobalt (hereinafter, abbreviated as Co) was fully mixed in the same manner as described above to produce a green powder for a substrate. The green powder for the sintered body was press molded in a metal mold to produce a disc like shaped article having a diameter of 13 mm and a thickness of 2 mm. The green powder for the substrate was press molded in the same manner as described above to produce a disc-like shaped article having a diameter of 13 mm and a thickness of 6 m. Separately, a plate made of industrial pure titanium and having a thickness of 0.5 mm was pressed into a capsule having a bottom and having an outer diameter of 14 mm and a height of 10 mm. Into the capsule, the shaped article produced from the green powder for substrate was first charged, then three sheets of disc-like foils made of an amorphous metal consisting of 23% by weight of Ni, 45% by weight of Si and 32% by weight of B, and each foil having a thickness of 30 μm and a diameter of 13 mm, were superposed and arranged on the shaped article for substrate, and further the shaped article produced from the green powder for sintered body was arranged on the amorphous disc-like foils and then the capsule was covered with a disc made of industrial pure titanium and having a diameter of 13 mm and a thickness of 0.5 mm. Two capsules, each containing the above described raw materials to be formed into a composite sintered compact therein, were superposed and arranged in a sample space of a belt-type ultra-high pressure apparatus, and sintered for 15 minutes under a condition of a pressure of 2.5 GPa and a temperature of 1,550° C. After completion of the sintering, the pressure and temperature were reduced to normal pressures and room temperatures respectively, and then the two capsules, each containing the resulting composite sintered compact therein, were taken out from the sample space.

In both the sintered masses, the capsule wrapping the composite sintered compact was removed by grinding it by means of a grinder, and then each of the resulting disc-shaped composite sintered compacts was cut into halves along a cutting line passing through the center of the circle of the disc-shaped composite sintered compact by means of a diamond blade to obtain two half disc-shaped composite sintered compacts. When each of the resulting half disc-shaped composite sintered compacts was observed by an optical microscope of 20 magnifications, the sintered body, the substrate and the intermediate layer were bonded to each other without formation of vacant space, and there were no defects, such as cracks, unsintered portions, voids and the like, in the sintered body and in the substrate.

The above obtained half disc-shaped composite sintered compact was further cut into halves such that the resulting one-fourth disc-shaped composite sintered compacts had an apex angle of 90°, and the resulting one-fourth disc-shaped composite sintered compact was silver-soldered to one of the positions corresponding to the cutting edge portions of the based metal for cemented carbide to produce a throw-away tip having a shape of CCMA433. Defects were not formed in the composite sintered compact during the brazing operation. Then, the throw-away tip was subject to a cutting test by the use of a substance to be cut, which was a non-heat treated S10C cylindrical steel having a diameter of 120 mm and a length of 500 mm and further having 4 grooves, each of which had a rectangular cross-sectional shape and had a width of 10 mm and a depth of 30 mm, arranged on its outer peripheral portion along the axis of the cylinder at an equal interval. That is, the outer periphery of the substance to be cut was cut in dry state by the above described throw-away tip for 90 minutes under a condition of a peripheral speed of 480 m/min, a depth of 0.8 mm and a feed of 0.34 mm/rev. During the cutting, that portion of the substance to be cut which had the grooves formed therein had been cut and removed within about 40 minutes, and hence the substance, from which the grooved portion had been cut off, was changed to a new substance to be cut every time the grooves disappeared, and the cutting test was continued for 90 minutes. As the result, a wear of 0.15 mm was observed in the flank of the sintered body portion of the throw-away tip. However, defects, for example, breakage, cracks and peeling off of the sintered body portion from the substrate, which were caused by the impact load during the use of the composite sintered compact, were not observed.

The above described test was carried out with respect to all composite sintered compacts obtained by 28 times of the sintering operations. The development of defects was tested by the observation by means of an optical microscope with respect to all the half disc-shaped composite sintered compacts. Further, one piece of one-fourth disc-shaped composite sintered compact having an apex angle of 90° was sampled from four pieces of one-fourth disc-shaped composite sintered compacts obtained in every one time of sintering, and tests were carried out with respect to the working of the sampled one-fourth disc-shaped composite sintered compact into the throw-away tip, and with respect to the cutting by the use of the throw-away tip. However, the development of defects was not at all observed in all the tested samples. The value of wear of the flank was varied within the range from 0.12 mm to 0.3 mm.

COMPARATIVE EXAMPLE 1

The sintering operation described in Example 1 was repeated without interposing the amorphous foils, which were used in Example 1, between the raw material disc-like shaped article for sintered body and the raw material disc-like shaped article for substrate, to produce disc-shaped composite sintered compacts. The number of sintering operations carried out in this Comparative example 1 was 38. When the cross-section of the half disc-shaped composite sintered compact obtained by cutting the disc-shaped composite sintered compact was tested in the same testing method as described in Example 1, very fine cracks were observed in the sintered body portion in 6 pieces of half disc-shaped composite sintered compacts among 76 pieces of half disc-shaped composite sintered compacts. Further, very fine cracks, which extended in a direction perpendicular to the bonding surface of the sintered body with the substrate, were observed in the substrate portion in 7 pieces of half disc-shaped composite sintered compacts. In the production of throw-away tip used for carrying out the cutting test, half disc-shaped composite sintered compacts having the above described defects were not used, but half disc-shaped composite sintered compacts not having the defects were used. However, when one piece of one-fourth disc-shaped composite sintered compact having an apex angle of 90° was sampled from four pieces of one-fourth disc-shaped composite sintered compacts obtained in every sintering, by which a good composite sintered product had been obtained, and then the brazing operation of the one-fourth disc-shaped composite sintered compacts to the base metal for cemented carbide was carried out in order to produce a throw-away tip, fine cracks were newly formed in 4 pieces of one-fourth disc-shaped composite sintered compacts, and the sintered body portion was peeled off from the substrate portion in 2 pieces of one-fourth disc-shaped composite sintered compacts. The same cutting test as described in Example 1 was carried out with respect to 28 throw-away tips not having the above described defects. As the result, 16 throw-away tips were able to finish a cutting test of 100 minutes. However, in the remaining 12 throw-away tips, the sintered body portion was peeled off from the substrate portion or the cutting edge was broken at a time from 20 to 80 minutes from the beginning of the test, and the cutting test was no longer able to be continued.

When an amorphous foil was interposed between the sintered body portion and the substrate portion as an intermediate layer, the fraction defective during the sintering was 0/56, that during the working into tool was 0/28 and that during the use was 0/28 as illustrated in Example 1. On the contrary, when the sintered body portion was directly bonded to the substrate portion as described in this Comparative example 1, the fraction defective during the sintering was 13/76, that during the working into tool was 6/30 and that during the use was 12/28. This proves that the composite sintered compact having the structure according to the present invention is superior to the composite sintered compact having a conventional structure. That is, the composite sintered compact of the present invention has such an excellent structure that the thermal strain caused during the sintering is relaxed by the amorphous intermediate layer having a high affinity to the sintered body portion and to the substrate portion.

EXAMPLE 2

A mixture of 20% by volume of diamond powder having an average particle size of 2 μm, 71% by volume of diamond powder having an average particle size of 15 μm and 9% by volume of Co powder having an average particle size of less than 44 μm was fully mixed, and the resulting green powder for sintered body was press molded into a raw material disc-like shaped article for sintered body in the same manners as described in Example 1. Into the same capsule as used in example 1 were charged the same raw material disc-like shaped article for substrate as used in Example 1, 2 sheets of amorphous foils, each foil having a diameter of 13 mm and having a composition consisting of 34% by weight of Co, 28% by weight of Cr, 24% by weight of Mo and 18% by weight of C, and the above obtained raw material disc-like shaped article for sintered body such that 2 sheets of the amorphous metal foils were interposed between the shaped articles for forming the sintered body and the substrate, and the capsule was covered with the same disc as described in Example 1. Then, the two capsules were superposed and placed in a sample space of a belt-type high pressure apparatus and sintered therein under a condition of a pressure of 5.5 GPa, a temperature of 1,500° C. and a retention time of 15 minutes. After completion of the sintering, the pressure and temperature were reduced to normal pressures and room temperatures, and then the above treated 2 capsules, each containing the resulting composite sintered compact therein, were taken out from the sample space. The capsule wrapping the composite sintered compact was removed by grinding it by means of a grinder, and then each of the resulting composite sintered compacts was cut into two pieces of half disc-shaped composite sintered compacts along a cutting line passing through the center of the circle by means of a laser beam. When the cross-section of each of the resulting half disc-shaped composite sintered compacts was observed by means of an optical microscope of 20 magnifications, the sintered body, the substrate and the intermediate layer were closely bonded to each other, and there were no defects, such as cracks, unsintered portions, voids and the like, in the sintered body and substrate. The above described experiments were carried out with respect to the composite sintered compacts obtained by 8 times of sinterings, and the obtained results were substantially the same with each other.

In an electric furnace were heated at 700° C. for 1 hour 32 pieces of half disc-shaped composite sintered compacts obtained by the 8 times of sinterings, and then directly poured into water kept at room temperature while the temperature of the composite sintered compact was 700° C., whereby the composite sintered compacts were rapidly cooled. Then, the half disc-shaped composite sintered compact was further cut into halves to produce two pieces of one-fourth disc-shaped composite sintered compacts, and the old cut surface and the new cut surface were ground with a diamond grinding wheel, then polished with a diamond paste to be formed into a mirror surface, and then observed by an optical microscopes of 20 and 100 magnifications. No defects, such as cracks, voids, breakages and the like, were observed in the sintered body and in the substrate. It has been found from the electron ray diffraction analysis that the amorphous portion interposed as an intermediate layer between the sintered body and the substrate do not remain in the form of a layer, but has been diffused into both the sintered body and the substrate in a depth of more than 100 μm.

COMPARATIVE EXAMPLE 2

The same experiment as described in Example 2 was carried out. However, in this Comparative example 2, the amorphous intermediate layer was not interposed between the sintered body and the substrate, and the raw material disc-like shaped article for sintered body was directly superposed on the raw material disc-like shaped article for substrate, and the superposed sintered body-forming shaped article and substrate-forming shaped article were charged into a capsule and sintered. After completion of the sintering, the pressure and the temperature were reduced to normal pressures and room temperatures, the above treated tow capsules, each containing a composite sintered compact therein, were taken out from the sample space, and the capsule covering the composite sintered compact was removed by grinding it by means of a grinder. The resulting disc-shaped composite sintered compact was divided into 2 pieces of half disc-shaped composite sintered compacts by means of a laser beam along a cutting line passing through the center of the circle. The same experiments as described above were carried out by 8 times, and each of the resulting half disc-shaped composite sintered compacts was examined by an optical microscope of 20 magnifications. As the result, although the sintered body was compactly bonded to the substrate, fine cracks, which extended in parallel to the bonding surface of the sintered body with the substrate, were observed in the substrate in 7 pieces of composite sintered compacts among 32 pieces of composite sintered compacts.

When the same rapid cooling test as described in Example 2, wherein a heated composite sintered compact was directly poured into water, was carried with respect to 25 pieces of composite sintered compacts other than composite sintered compacts which had cracks formed in the substrate, and then each of the thus treated half disc-shaped composite sintered compacts were divided into 2 pieces of one-fourth disc-shaped composite sintered compacts, there were observed cracks formed in the sintered body extending in parallel or perpendicular to the bonding surface or in a random direction in 8 pieces of one-fourth disc-shaped composite sintered compacts among 50 pieces of one-fourth disc-shaped composite sintered compacts.

EXAMPLE 3

The same experiments as described in Example 1 were carried out by the use of various amorphous metals as an intermediate layer. The composition of the amorphous intermediate layer, the bonding condition and the results of experiments are shown in the following Table 1. The small numeral suffixed to an element constituting an amorphous metal indicates the content in % by weight of the element in the amorphous.

TABLE 1

| | Influence of an amorphous intermediate layer upon a composite sintered compact comprising a high density boron nitride sintered body | | | | |
|---|---|---|---|---|---|
| Composition of amorphous | Thickness of a foil (μm) | Number of foils | Bonding | Defects in the resulting composite sintered compact | Rapid cooling test |
| $Co_{70.3}Fe_{4.7}Si_{15}B_{10}$ | 20 | 3 | good | no | no defects |
| $Co_{72}Fe_3P_{16}B_6Al_3$ | 20 | 2 | good | no | no defects |
| $Co_{61.6}Fe_{4.2}Hf_{4.2}Si_{10}B_{20}$ | 23 | 4 | good | no | no defects |
| $Co_{81.5}Mo_{9.5}Zr_{9.0}$ | 32 | 1 | good | no | no defects |
| $Ti_{50}Cu_{50}$ | 25 | 3 | good | no | no defects |

EXAMPLE 4

The same experiments as described in Example 2 were carried out by the use of various amorphous metals as an intermediate layer. The composition of the amorphous intermediate layer, the bonding condition, and the results of the experiments are shown in the following Table 2. The small numeral suffixed to an element constituting an amorphous indicates the content in % by weight of the element in the amorphous metal.

TABLE 2

| | Influence of an amorphous intermediate layer upon a composite sintered compact comprising a diamond sintered body | | | | |
|---|---|---|---|---|---|
| Composition of amorphous | Thickness of a foil (μm) | Number of foils | Bonding | Defects in the resulting composite sintered compact | Rapid cooling test |
| $Co_{70.3}Fe_{4.7}Si_{15}B_{10}$ | 20 | 3 | good | no | no defects |
| $Ni_{53.2}Cr_{11.3}W_8Fe_4B_{22}Si_{1.5}$ | 25 | 2 | good | no | no defects |
| $Ni_{51}Co_{23}Cr_{10}Mo_7Fe_{5.5}B_{3.5}$ | 20 | 2 | good | no | no defects |
| $Co_{73.9}Zr_{12.6}Nb_{13.5}$ | 25 | 2 | good | no | no defects |
| $Ti_{50}Cu_{50}$ | 25 | 3 | good | no | no defects |
| $Co_{70}Mn_6B_{24}$ | 35 | 1 | good | no | no |

TABLE 2-continued

| | Influence of an amorphous intermediate layer upon a composite sintered compact comprising a diamond sintered body | | | | |
|---|---|---|---|---|---|
| Composition of amorphous | Thickness of a foil (μm) | Number of foils | Bonding | Defects in the resulting composite sintered compact | Rapid cooling test |
| $Co_{66.3}Zr_{11.3}Ta_{22.4}$ | 25 | 2 | good | no | defects no defects |

COMPARATIVE EXAMPLE 3

The same experiments as described in Example 1 were carried out. However, in this Comparative example 3, Co powders having an average particle size of 44 mμ were interposed in a thickness of about 0.2 mm as an intermediate layer between the sintered body-forming shaped article and the substrate-forming shaped article in place of an amorphous foil layer. When the resulting composite sintered compacts were examined in the same manner as described in Example 2, no defects were observed in the test with respect to the composite sintered compacts after the sintering. However, in the rapidly cooled composite sintered compacts, cracks were observed in the substrate in 18 pieces of one-fourth disc-shaped composite sintered compacts among 40 pieces of one-fourth disc-shaped composite sintered compacts.

COMPARATIVE EXAMPLE 4

The same experiments as described in Example 1 were carried out. However, in this Comparative example 4, an Ni foil having a thickness of 0.1 mm was interposed as an intermediate layer between the sintered body-forming shaped article and the substrate-forming shaped article in place of an amorphous foil layer. When the resulting composite sintered compacts were examined in the same manner as described in Example 2, no defects were observed in 20 pieces of half disc-shaped composite compacts, except that cracks having a length of about 3 mm, which were extending in parallel to the bonding surface, were observed in the Ni intermediate layer portion in one piece of half disc-shaped composite sintered compact among 20 pieces of half disc-shaped composite sintered compacts. In the rapidly cooled composite sintered compacts, cracks were observed in the sintered body portion or substrate portion in 13 pieces of one-fourth disc-shaped composite sintered compacts among 38 pieces of one-fourth disc-shaped composite sintered compacts. The Ni intermediate layer remained between the sintered body and the substrate in the form of a layer having a thickness of 0–10 μm.

EXAMPLE 5

The same experiments as described in Example 1 were carried out. However, in this Example 5, an Mo plate having a thickness of 0.5 mm was used in the substrate. When the resulting composite sintered compacts were subjected to the same tests as described in Example 1, satisfactory results were obtained in all the resulting composite sintered compacts.

COMPARATIVE EXAMPLE 5

The same experiments as described in Example 5 were carried out. However, in this Comparative example 5, the intermediate amorphous layer was not used, but the sintered body-forming sintered body was directly superposed on the Mo plate. In this Comparative example 5, 5 times of sinterings were carried out. However, good composite sintered compacts were not obtained in any of the sinterings. In all of the resulting composite sintered compacts, the sintered body was locally bonded to the substrate, and the sintered body was peeled off from the substrate during its cutting into halves.

As described above, a composite sintered compact having the structure of the present invention, wherein a sintered body is bonded to a substrate through an amorphous foil intermediate layer interposed between them, is remarkably smaller than a composite sintered compact having the conventional structure in the development of defectives during the whole processes ranging from its production to its consumption, that is, during the steps of the sintering for its production, of its working into tool and of its use. Accordingly, the present invention can improve remarkably the quality of a composite sintered compact comprising a sintered body containing a high density boron nitride or comprising a sintered body containing diamond, and is a very commercially valuable and useful invention.

What is claimed is:

1. A composite sintered compact consisting essentially of:
   a sintered body portion containing at least one material selected from the group consisting of high density boron nitride and diamond;
   a substrate portion containing at least one material selected from the group consisting of metal and cermet; and
   a crystallized metal portion interposed between said sintered body portion and said substrate portion;
   wherein said sintered body portion is bonded to said substrate portion through an amorphous metal layer during a sintering operation under a pressure of about 2.5–5.5 GPa, a temperature of about 1500°–1550° C. and a sintering time of about 15 minutes, whereupon said amorphous metal layer is converted into said crystallized metal portion.

2. A composite sintered compact according to claim 1, wherein said amorphous metal comprises at least one material selected from the group consisting of Ti, Zr, Hf, Fe, Co, Ni, Cr, Mn, Mo, Ta, Nb Cu, Au, Ag, B, Al and Si.

* * * * *